Patented May 23, 1950

2,508,404

UNITED STATES PATENT OFFICE 2,508,404

CHROMIFEROUS MONAZO DYES AND METHODS OF MANUFACTURING THE SAME

Donovan E. Kvalnes, Penns Grove, and Boyce G. Carson, Woodstown, N. J., assignors to E. I. du Pont de Nemours & Company, Wilmington, Del., a corporation of Delaware No Drawing. Application July 7, 1948, Serial No. 37,505

2 Claims. (Cl. 260—146)

This invention relates to new chromiferous monazo dyes and to processes of manufacturing the same; and especially to such dyes having 1,3-isoquinoline-diol as one component, and to the manufacture thereof by novel methods. The components of the dyes of the present invention are so combined and constituted that they possess surpassing brilliance among their other desirable properties and the methods of manufacturing them are composed of practicable manufacturing operations which produce excellent economical yields.

A chromed dye made by prechroming the monazo compound resulting from coupling the diazo of 4-chloro-2-aminophenol-6-sulfonic acid with 2,4-dihydroxy quinoline was heretofore known (U. S. Patent No. 1,775,644). According to other disclosure of the prior art, namely, U. S. Patent 961,355, the unchromed monazo compound from which this product was prepared was made according to well known methods of diazotizing the chloro-aminophenol sulfonic acid in the presence of an indefinite amount of hydrochloric acid and coupling the diazo compound to the disodium salt of the dihydroxy quinoline in the presence of soda ash, and then separating the monazo compound by salting and filtration. No disclosure is made in Patent 1,775,644 concerning the making of the unmetallized monazo compound other than that which may be imported by reference to Patent No. 961,355. In making such prior art chromiferous compounds, the free acid of the dye was chromed by heating it in aqueous medium with chromium formate in the presence of an excess of formic acid at 120° C. for a period of two hours. The resulting insoluble compound was then separated from the reaction medium and solubilized by dissolving it in aqueous caustic soda solution, thereafter salting the sodium salt of the complex then formed. In a second patent, namely, U. S. Patent 1,908,571, it is disclosed that the monazo compound of U. S. Patent 961,355 can be converted into a chromium complex by heating the monazo compound with neutral chromic sulfate, but no further instruction is given. In a third disclosure of the prior art, namely, U. S. Patent 1,989,570, it is set forth that a chromic complex of the aforesaid monazo compound can be prepared by chroming with alkaline sodium chromite under conditions which make a final product containing less than one chromium atom for each molecule of the unchromed monazo compound.

U. S. Patent 961,355 discloses that the monazo compound made from 2,4-dihydroxy quinoline is chromable on the fiber either by the chromate or after-chromate method. As compared to that compound, the corresponding isomeric monazo compound prepared from 1,3-isoquinoline-diol and the diazo of 4-chloro-2-aminophenol-6-sulfonic acid is completely and rapidly destroyed whenever an attempt is made to apply it to wool by either of these methods. This isomeric monazo compound can be coupled and isolated by the method of U. S. Patent 961,355 but the product thus produced is contaminated by such a large content of salt that it is almost impossible to prechrome the dye. It cannot be chromed at all except under conditions of such extreme dilution that the process is not practicable or feasible. The chroming methods disclosed in U. S. Patents No. 1,775,644, No. 1,908,571 and No. 1,989,570 fail completely when applied to the isomeric compound from isoquinoline-diol because the chroming agents employed are inoperable when applied to that compound, and the metalized products from the isoquinoline-diol combinations are useless unless they are fully chromed. For some peculiar reason there is never more than a trace of the half-chromed dye present after applying any chroming procedure which is operable to make a satisfactory metallized isoquinoline-diol dye. There is unchromed dye present until the very end of all chroming procedures where the monazo compounds containing 1,3-isoquinoline-diol of this invention are involved. No way has been found to cause these unchromed monazo compounds to react with the fully-chromed dye to give a half-chromed dye or to separate the fully chromed compound from unchromed and half-chromed varieties.

The consequence of the deficiency is that dyeings obtained from the incompletely chromed dye are always yellow and dull, and they have poor application and fastness properties as compared to those obtained from completely chromed samples. In chroming the dye of Patent 1,775,644 the chroming is customarily stopped before chroming is complete. Any unchromed dye present is caused to react with fully-chromed dye during the solubilizing procedure to form the half-chromed dye which has good application and fastness properties. The result is that the final product is bluer in shade than it would otherwise be if the chroming were carried to completion. Observations indicate that the first manufacture of the dye of Patent 1,775,644 gave a product which contained approximately 10% of the half-chromed product. The shade and fastness properties were then acceptable. In subsequent manufacturing operations the original shade has been duplicated by stopping the chroming before the chroming operation was complete. In addition we have found that whether or not the chroming reaction is complete that dye has poor affinity for nylon and the dyeing of nylon therewith involves a waste of approximately 25% of the dye which is far inferior to the affinity and dyeing properties of the dye of the present invention.

It has now been found that a soluble fully chromed monazo dye having excellent brilliance, excellent affinity for wool and nylon and good general properties can be made by a novel combination of process steps which involves novel procedures in making the monazo compound resulting from coupling the diazo compound of 4-chloro-2-aminophenol-6-sulfonic acid with 1,3-isoquinoline-diol, as well as a novel procedure in the chroming operation. In general, substantial amounts of mineral acid salts, such as sulfates and chlorides, must be excluded from the metallizing medium in order to obtain metallization of the aforesaid monazo compound in the desired proportion of one atom of chromium for each molecule of the monazo compound, and absence of such salts is desirable. This may be done by using amine from which such salts have been removed as by washing with water, by diazotizing the amine in the presence of a minimum amount of hydrochloric acid, or by nitrous acid in the absence of hydrochloric acid, and by otherwise proceeding so as to produce a final metallizing medium in which no mineral acid salts are present or in which the mineral acid salts present do not exceed a definite limit.

When diazotization is carried out in hydrochloric acid medium with sodium nitrite, about 0.1 mol of hydrochloric acid per mol of the amine should not be exceeded. Diazotization of 4-chloro-2-aminophenol-6-sulfonic acid in the absence of hydrochloric acid is feasible. Only a slight excess of caustic soda over that necessary to dissolve 1,3-isoquinoline-diol may be present in the water solution of the coupling component. The salt content of any presscake which might be made from salting out of the monazo compound must be held to a value which will not result in the presence of an unpermissible content of salt in a chroming medium made by dissolving such a cake in water. Small excesses of alkalies, such as caustic soda, may be partially or wholly neutralized with acetic acid for adjusting the pH value of the metallizing medium in order to avoid the presence of mineral acids in the metallizing medium and to avoid the formation of chromium hydroxide when the mixture is heated for forming the chromium complex. The chroming is then carried out by the action of chromic fluoride or chromic acetate and in the absence of salts of strong acids, or in the presence of not more than about 10 grams per liter of sodium chloride or salts of other mineral acids equivalent in their deleterious effect to 10 grams per liter of sodium chloride. Equal weights of salts of other mineral acids do not have exactly the same deleterious effect as sodium chloride. For example, sodium sulfate is slightly less deleterious than sodium chloride and a somewhat greater concentration of the same may be tolerated. The term, 10 grams of sodium chloride equivalent as used in the present specification and claims refers to the deleterious effect upon the chroming procedure here disclosed of 10 grams of sodium chloride, as well as to an amount of salt of other mineral acids which has the same deleterious effect on the chroming operation as 10 grams per liter of sodium chloride. Substantially all of the monazo compound must be fully chromed. In this connection, the term, substantially all, means that there is no detectable quantity of unchromed dye present. There is never more than a detectable amount, or trace of half-chromed dye in the final chroming mixture or in the final product.

The following examples are given as illustrative embodiments of the invention and not as limitations thereof. Parts are expressed as parts by weight unless otherwise specified.

*Example 1*

One-tenth mol of 4-chloro-2-aminophenol-6-sulfonic acid is diazotized at 10°–15° C. in a solution composed of 500 grams of water with 36.5 grams of hydrochloric acid as a 10 N solution and 6.9 grams of sodium nitrite as a 5 N solution. This diazo solution is added slowly to a solution made by dissolving 16.9 grams of 1,3-isoquinoline-diol in 500 grams of cold water containing 4.4 grams of caustic soda and 20 grams of sodium carbonate. The coupling is complete in a few minutes, after which the dye is isolated from the solution by the addition of common salt and filtration. The wet presscake is then slurried at room temperature for one hour in 1000 grams of water containing just enough caustic soda to give the solution a strong alkaline reaction to Clayton Yellow paper. At the end of one hour the alkalinity of the solution is reduced to the point where it is no longer alkaline to Brilliant Yellow paper, the pH value of which is about 6.5–7.0. The dye is in solution and is represented by the formula

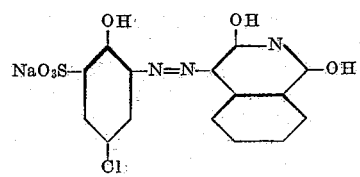

To this neutralized solution is then added 20 grams of chromium fluoride trihydrate. At this point the pH value shifts and finally comes to an equilibrium at about 3.6. The mixture is then refluxed for a period of several hours. When the formation of the full chromium complex is complete, the solution is a deep violet containing no reddish-brown particles. The chromium complex is salted out with common salt and filtered.

This dye when applied in the usual way from a bath containing 4%–6% sulfuric acid (based on the weight of wool used) dyes wool evenly in a very bright bluish pink shade. The dyeings are fast-to-light, fulling and washing. The dye has excellent affinity for nylon.

In the free acid form this dye has excellent alcohol solubility. Applied from an alcoholic solution this dye is very bright, strong and very fast-to-light.

*Example 2*

One-tenth mol of 4-chloro-2-aminophenol-6-sulfonic acid which has been purified from free mineral acids and salts of strong mineral acids by stirring with water at room temperature, filtering and washing with water until the washings have a pH of 2.2, is stirred in 200 grams water with 0.365 gram hydrochloric acid until a smooth slurry is obtained. The material is diazotized by adding 6.9 grams of sodium nitrite. The diazo solution is added with rapid stirring to a solution of 16.9 grams of 1,3-isoquinoline-diol in 500 grams of water containing 4.6 grams caustic soda. Coupling is rapid. At the end of the coupling the pH of the mixture is 8.7. The pH of the mixture is adjusted to 7.4 by the addition of acetic acid and 41.2 grams of chromic fluoride trihydrate is added. The total volume is adjusted to 2000 cubic centimeters. This pH value then shifts and comes to an equilibrium at about 3.5 in the early stages of heating. The mixture is boiled for approximately 20 hours or until substantially all of the monazo compound in the chroming mixture is combined with chromium in the proportion of one atom of chromium to each molecule of the monazo. The mass is stirred until the temperature has dropped to approximately 60° C. at which time the chromed dye is salted out of solution by the addition of 200 grams of common salt. The dye is filtered from the mother liquor and is dried in air at approximately 75° C. The drying conditions are not critical. After being dried, the chromium complex has excellent solubility in water and in an acidified dyebath. Applied to wool from a bath containing 6% sulfuric acid and 10% Glauber's salt based on the weight of the wool it produces a very even bluish-pink dyeing with excellent fastness properties. This is the same dye as that produced in accordance with Example 1.

The dye as obtained by the above procedure is not soluble in alcohol. Solubility in alcohol may be obtained by stirring the dye in hydrochloric acid at room temperature, filtering off the free acid and washing it with water containing a small amount of hydrochloric acid to remove the slight accumulation of salts. The free acid of the complex has excellent solubility in alcohol and dyeings produced by the alcoholic solutions are very bright and have excellent fastness properties.

*Example 3*

6.7 grams of 4-chloro-2-amino-phenol-6-sulfonic acid was diazotized with the use of 0.3 cubic centimeters of 10 N hydrochloric acid and 6.0 cc. of 5 N sodium nitrite in 60 cc. of water at room temperature. The diazotized solution was added slowly to a solution of 5.1 grams 1,3-isoquinoline-diol dissolved in about 200 cubic centimeters of water containing 6.0 grams of caustic soda. When the coupling was complete the pH of the mixture was reduced to 2.2 by the addition of hydrochloric acid. The free acid of the mixture was removed by filtration and the presscake was washed by water on the filter. The presscake was added to 18.5 grams commercial basic chromium acetate, corresponding to 4.5 grams of chromium and water was added to adjust the volume to 150 cc. The pH of this mixture adjusted itself to a value of 3.9. The whole was heated under reflux conditions until the dye was completely chromed. Chroming was complete in 5 hours.

Dyeings on wool, obtained by dissolving the chromium complex in a small amount of caustic soda solution and neutralizing the alkaline solution before adding it to the dyebath were similar in all respects to those obtained from the chromium complex obtained in Example 2.

The corresponding isomeric dye of U. S. Patent 1,775,644 prepared as the free acid and chromed under similar conditions with basic chromium acetate required 100 hours of heating under reflux conditions for about 90% full chroming.

The range of pH value and mineral salt content (if present) must be restricted within the specified limits in order to obtain practicable yields of fully chromed soluble product having the brilliance and desirable dyeing properties of the compounds specifically described within practicable time limits, but some of the details of procedure may be widely varied provided they do not impose upon the chroming medium an intolerable content of mineral acid salt. For example, considerable variation can be made in the diazotization procedure both in the temperature and acid content of the medium. Coupling is readily completed in alkaline medium and considerable variation in the rate and temperature of coupling may be made within broad limits of temperature such as about 0° C. to about 40° C. While the normal reflux temperature of 103° C. is usually preferable, chroming temperatures from about 95° C. to a temperature just below the decomposition temperature of the product, say about 125° C., may be used in the chroming operation.

When the processes are carried out within the limitations hereinbefore described the yields of metallized product made from 1,3-isoquinoline-diol are substantially 100% while the yields of chromed product obtained from 2,4-dihydroxy quinoline by prior art processes range from about 60% to about 80%. The behavior toward hot alkali of the unchromed monazo compound made from 1,3-isoquinoline-diol is distinguished from that made from 2,4-dihydroxy quinoline by being rapidly decomposed, whereas the hot alkali appears to have no effect on the latter. Attempts to chrome the dye from 1,3-isoquinoline-diol on wool resulted in decomposition of the dyeing, whereas a chromium complex was formed with dyeings made with the corresponding monazo dye from 2,4-dihydroxy quinoline under similar conditions.

Attempts to chrome in substance the monazo compound from 1,3-isoquinoline-diol by the methods set forth in the prior art heretofore mentioned for chroming in substance the isomeric monazo compound from 2,4-dihydroxy quinoline resulted in failure, whereas chroming of the monazo from 2,4-dihydroxy quinoline according to said prior art occurred in about 2 to 24 hours. As compared to the behavior of the monazo compounds from 2,4-dihydroxy quinoline when treated by the presently disclosed chroming methods, the isomeric monazo compounds from 1,3-isoquinoline-diol completely chrome in about 5 to 20 hours, whereas the isomeric monazo compounds from 2,4-dihydroxy quinoline require a treatment of about 80 to 100 hours.

A very noticeable difference in properties of the two dyes is seen to exist from the comparison of prechroming operations. The deleterious effect of soluble salts of strong acids has not been disclosed heretofore in so far as we are aware. We have found that in prechroming the dye from 1,3-isoquinoline-diol the salts of strong acids when present beyond certain definite limits have the effect of very greatly retarding the chromium reaction, especially the formation of the fully-chromed dye, i. e. the complex containing one atom of chromium for each molecule of dye, whereas the presence of these salts has no such pronounced effect on the prechroming of the described monazo compound from 2,4-dihydroxy quinoline.

This is a continuation-in-part of our copending application Serial No. 493,252, filed July 2, 1943, now abandoned.

We claim:

1. The process of manufacturing a soluble chromium complex of a monazo compound containing one atom of chromium for each molecule of the monazo compound, which comprises making a metallizing medium composed essentially of a water solution of the monazo compound represented in its acid form by the formula

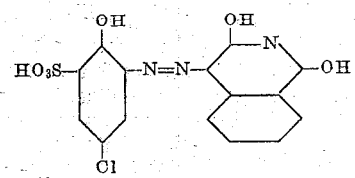

and a chromium salt of the group consisting of chromium fluoride and chromium acetate, said medium being substantially devoid of other mineral acid salts except sodium salts of the group consisting of hydrochloric acid and sulfuric acid which are not greater in amount than the chemical equivalent of about 10 grams per liter of sodium chloride; said solution having a pH value of about 7.4; and heating to a temperature range of about 95° C. to about 125° C. until substantially all of the monazo compound is metallized in the ratio of one atom of chromium to one molecule of the monazo compound.

2. The process of manufacturing a soluble chromium complex of a monazo compound containing one atom of chromium for each molecule of the monazo compound, which comprises diazotizing 4-chloro-2-aminophenol-6-sulfonic acid which is substantially devoid of salts of mineral acids in a medium containing about one tenth of a mol equivalent of hydrochloric acid; coupling the resulting diazo with 1,3-isoquinoline-diol by mixing said diazo mixture with an alkaline water solution of said coupling component which contains sufficient caustic soda to result after coupling in a medium having a pH value of about 8.7; adjusting the pH value of said medium to a pH value of about 7.4 by adding acetic acid; adding chromic fluoride to said adjusted medium; and heating to about 95° C. to about 125° C. until substantially all of the monazo compound is combined with chromium in the ratio of one atom of chromium to one molecule of the monazo compound.

DONOVAN E. KVALNES.
BOYCE G. CARSON.

REFERENCES CITED

The following references are of record in the file of this patent:

UNITED STATES PATENTS

| Number | Name | Date |
|---|---|---|
| 961,355 | Jansen et al. | June 14, 1910 |
| 1,775,644 | Kammerer | Sept. 16, 1930 |
| 1,908,571 | Straub et al. | May 9, 1933 |
| 1,989,570 | Straub | Jan. 29, 1935 |

OTHER REFERENCES

Meyer and Vittenet: Annales der Chim. (10), vol. 17, pages 302–329 (1932).